(12) United States Patent
Phatak

(10) Patent No.: US 10,080,048 B2
(45) Date of Patent: Sep. 18, 2018

(54) SUBSCRIPTION SERVICE FOR AUTHORIZING ACCESS TO MEDIA CONTENT

(71) Applicant: Adobe Systems Incorporated, San Jose, CA (US)

(72) Inventor: Anand Phatak, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 30 days.

(21) Appl. No.: 15/248,290

(22) Filed: Aug. 26, 2016

(65) Prior Publication Data

US 2018/0063564 A1 Mar. 1, 2018

(51) Int. Cl.
*H04N 21/2543* (2011.01)
*H04N 21/472* (2011.01)
*H04N 21/258* (2011.01)
*H04N 21/475* (2011.01)

(52) U.S. Cl.
CPC ... *H04N 21/25816* (2013.01); *H04N 21/2543* (2013.01); *H04N 21/25875* (2013.01); *H04N 21/472* (2013.01); *H04N 21/4753* (2013.01)

(58) Field of Classification Search
CPC ......... H04N 21/25816; H04N 21/2543; H04N 21/25875; H04N 21/472; H04N 21/4753
USPC ......................................................... 725/25
See application file for complete search history.

(56) References Cited

U.S. PATENT DOCUMENTS

| 5,815,665 A * | 9/1998 | Teper ..................... G06Q 20/00 705/26.35 |
| 5,915,008 A * | 6/1999 | Dulman .............. H04L 63/0281 370/352 |
| 2011/0119738 A1* | 5/2011 | Piepenbrink .......... H04L 9/3226 726/4 |
| 2013/0111517 A1* | 5/2013 | Dillon ..................... G06F 21/10 725/25 |
| 2014/0040122 A1* | 2/2014 | Ogawa ................... G06Q 10/00 705/39 |
| 2014/0298418 A9* | 10/2014 | Cronk .................. H04L 63/102 726/4 |

(Continued)

*Primary Examiner* — Nathan Flynn
*Assistant Examiner* — Caroline Somera
(74) *Attorney, Agent, or Firm* — Kilpatrick Townsend & Stockton LLP

(57) ABSTRACT

Embodiments are provided for automatically providing subscriber authentication and authorization services. For example, a subscription service communicates with an identity service provider to authenticate subscribers requesting video content from programmers and a payment service provider to confirm that authenticated subscribers are authorized to receive the content. The subscription service receives a media request for a programmer to provide media content to a subscriber device. The media request includes subscriber information for a subscriber associated with the subscriber device. The subscription service transmits the subscriber information to an identity service provider and receives the subscriber's authentication status from the identity service provider. The subscription service sends an entitlement check request to a payment service provider to determine whether the subscriber is authorized to access the content. Then, based on the entitlement check, the subscription service informs the programmer that the subscriber device is entitled to access to the requested media content.

20 Claims, 9 Drawing Sheets

(56) References Cited

U.S. PATENT DOCUMENTS

| | | | |
|---|---|---|---|
| 2014/0351596 A1* | 11/2014 | Chan | H04L 63/08 713/170 |
| 2015/0195594 A1* | 7/2015 | Hicks | H04N 21/2665 725/25 |
| 2015/0312257 A1* | 10/2015 | Antipa | H04L 63/10 709/225 |
| 2015/0324762 A1* | 11/2015 | Cook | G06Q 20/322 705/45 |
| 2015/0339696 A1* | 11/2015 | Zhou | G06Q 30/0222 705/14.23 |
| 2016/0057473 A1* | 2/2016 | Mitchell | H04N 21/4383 725/25 |
| 2016/0088327 A1* | 3/2016 | Cronk | H04L 63/102 725/30 |
| 2016/0189137 A1* | 6/2016 | Zhou | G06Q 20/3274 705/14.34 |

* cited by examiner

SUBSCRIPTION SERVICE FOR AUTHORIZING ACCESS TO MEDIA CONTENT

TECHNICAL FIELD

The present disclosure generally relates to techniques for authorizing access to electronic content, and more particularly relates to a subscription service for improving the efficiency and effectiveness of computing systems providing television and other video services through electronic communication networks.

BACKGROUND

Multi-channel video program distributors (MVPDs), such as cable television providers and satellite television providers, provide multiple television channels to subscribers over dedicated networks. The individual media content offered to subscribers is typically provided by numerous, different programmers or other content providers.

As use of the Internet and mobile computing devices has grown, users have begun to access media channels through the Internet, on mobile devices, and by directly looking for programmer-provided content outside of the dedicated MVPD networks. For example, a given subscriber will have a subscription with a cable television company, MVPD A, and seek to watch a video provided by content provider B on his mobile device. As a result, content providers seek to distribute content through online resources such as web applications, mobile apps, set-top-boxes, and game consoles. Content providers need to ensure that only paying subscribers get access to certain content.

With existing systems, content providers and programmers provide video to subscribers based on MVPD authentication and authorization. Such systems, where the MVPD functions as an identity provider for the subscriber, checks the subscriber's entitlement to access content, and processes subscription payments, cannot operate efficiently when problems arise with MVPD authentication and authorization. Such systems may not adequately respond when problems arise during periods of high-traffic for a provider (e.g., breaking news, the beginning of a sporting event, etc.), MVPD servers are sometimes overwhelmed with requests to authenticate subscribers or verify that the subscribers are authorized to access content from the programmers. The MVPDs are often not able to process requests due to having to process the extreme volume in such circumstances and the result is that many subscribers cannot access to the videos at all or end up experiencing long delays without having access to the videos.

Therefore, it is desirable to provide a subscription service that enables efficient authentication and authorization of subscribers seeking to access media content without relying on an MVPD.

SUMMARY

Systems and methods disclosed herein perform authentication and authorization of subscribers seeking to access media content from a multi-channel media distributor or content programmer. In some embodiments, a subscription service communicates with an identity service provider and a payment service provider to authenticate subscribers requesting content from content programmers, such as providers of videos or other media content on a channel, or to confirm that authenticated viewers are authorized to receive content from the programmers. The subscription service is positioned between content providers, programmers, third party identity service providers, and payment service providers. The subscription service communicates with a third-party identity service provider and a third-party payment service provider to efficiently perform authentication and authorization operations on behalf of content providers and programmers.

In some examples, a subscription service receives requests from various content providers to provide media content to subscriber devices and transmits the requests to third-party service providers who handle registering new subscribers (e.g., creating subscriber identities), authenticating subscribers, payment processing, and entitlement checking so that the content providers can and provide access to the privileged content without relying on a multi-channel media distributor or MVPD. The subscription service communicates with an identity service provider and a payment service provider for authenticating subscribers and authorizing the subscribers' access to content based on the transmitted requests. In one example, a method creates identity profiles and accesses an authentication state of a subscriber through a set of application programming interfaces (APIs) exposed to the content provider's website or mobile app in order to authenticate subscribers. The subscription service facilitates creating, editing, and querying subscriptions to watch video programs by using APIs that are exposed to the content provider's website, web application, or mobile app. The subscription service, in some embodiments, specifies appropriate interactions with a third party identity service provider and a third party payment service provider using an asynchronous system of functions and callbacks defined by APIs.

Example methods and systems use a subscription service to provide authentication and authorization services for subscribers seeking to access media content directly from programmers or content providers. In one example, a subscription service communicates with an identity service provider to authenticate subscribers requesting content from programmers and a payment service provider to confirm that authenticated subscribers are authorized to receive content from the programmers. According to this example, a subscription service receives a media request for a programmer to provide media content to a subscriber device. The media request includes subscriber information for a subscriber associated with the subscriber device. The subscription service transmits the subscriber information to an identity service provider, and then receives an authentication status of the subscriber from the identity service provider. That is, the identity service provider is responsible for authenticating the subscriber and providers the subscriber's identity. The authentication status provides the subscriber's identity by indicating who the subscriber is. For example, the authentication status can indicate the subscriber name, email address, mailing address, phone number, or other identifying information. Then, based on the authentication status, the subscription service transmits a request to a payment service provider to respond indicating that the subscriber device is entitled to access the requested media content. In one embodiment, the response from the payment service provider is received by the subscription service and then sent to the programmer to indicate the subscriber device's entitlement.

In another example a method for authorizing access to media content includes receiving, at a subscription service executed by a processing device, a media request for a programmer to provide media content to a subscriber device.

The media request includes subscriber information for a subscriber associated with the subscriber device. The subscription service then transmits the subscriber information to an identity service provider. The subscription service receives an authentication status of the subscriber from the identity service provider. The authentication status indicates an identity of the subscriber. Then, the subscription service transmits an entitlement check request for the subscriber to a payment service provider. Next, the subscription service receives a response to the entitlement check request from the payment service provider. The entitlement check response indicates whether the subscriber is authorized to access the media content.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
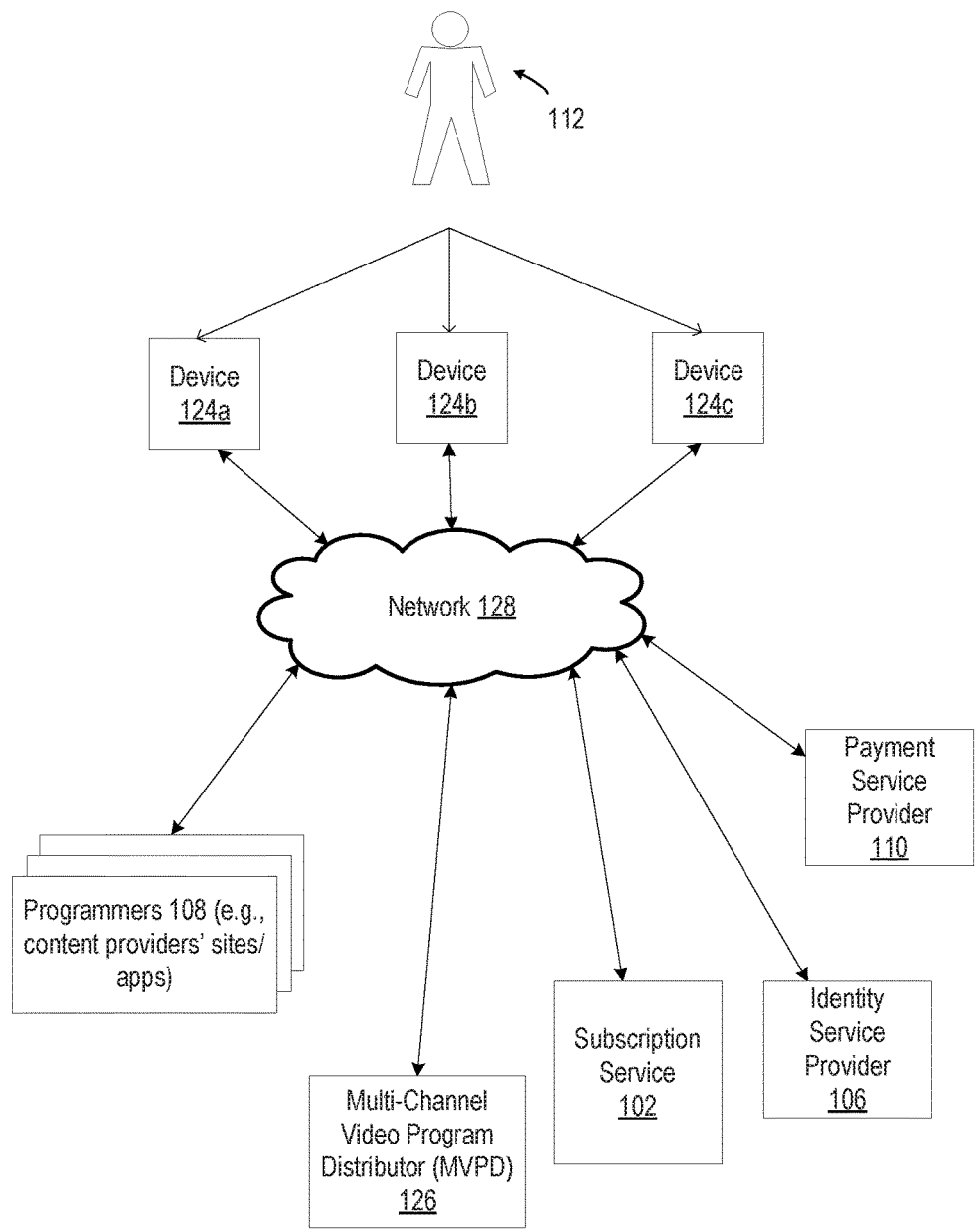
FIG. 1 is a block diagram depicting an example system in which a subscriber receives media content from a programmer over a network according to certain exemplary embodiments.

As described above, while existing systems may allow a subscriber to access video even when not at home (and thus unable to access an MVPD dedicated network) or when the subscriber uses a mobile device rather than a television to view video, these systems place burdens on MVPDs. In such systems, an MVPD authenticates a subscriber by verifying that the subscriber has presented valid credentials for a given programmer in response to the user's computing device attempting to view or otherwise access an online resource (e.g., a TV channel) on the programmer's web site. In existing systems where an MVPD performs authorization by verifying that a subscriber with authenticated credentials is entitled to access a particular resource provided by the programmer, MVPD servers and network can be a bottleneck during periods of high demand (e.g., during breaking news, the beginning of a sporting event, etc.). These existing systems, in which MVPDs provide authentication and authorization functions for content programmers and providers are resource intensive, cumbersome, and can result in delayed access for subscribers seeking to access media content.

In some existing systems, content providers perform the resource-intensive operations of offering subscription services, such as creating their own identity and payment services, or integrating with the third-party identity and payment service providers. This requires a considerable amount of development and maintenance effort that results in high cost. Content providers can also opt to outsource identity management, entitlement management/checking and payment processing functions to existing applications, but this comes with a high-revenue sharing cost, as such, outsourcing may result in as much as 30% fee for each payment transaction.

The problems with existing systems are addressed by using a subscription service to perform subscriber authentication and authorization. For example, when a subscriber accesses a website, web application, or mobile device app provided by a programmer or content provider, the content provider can use a subscription service to authenticate the subscriber and confirm that the subscriber's access to the video is consistent with the subscriber's subscription.

In one example, a subscription service receives requests from various content providers to provide media content to subscriber devices and transmits the requests to an identity service provider. The subscription service communicates with the identity service provider for authenticating subscribers and a payment service provider for authorizing the subscribers' access to content access based on the transmitted requests. The subscription service facilitates creating, editing, and querying subscriptions to watch video programs through a set of APIs exposed to the content provider's website or mobile app. The subscription service transmits subscriber information to an identity service provider, and then receives the subscriber's authentication state from the identity service provider. The identity service provider is responsible for authenticating the subscriber and providers the subscriber's identity. In this example, the authentication state identifies the subscriber by indicating who the subscriber is. For example, the authentication state can indicate the subscriber's name, email address, mailing address, phone number, or other identifying information. The subscription service also enables performing an entitlement check. The entitlement check indicates whether the subscriber is authorized to access the media content. Based on the authentication state, the subscription service transmits an entitlement check request to the payment service provider. In response to receiving the entitlement check request, the payment service provider will then respond to the programmer indicating whether the subscriber is entitled to access the requested media content. According to this example, the entitlement check response from the payment service provider is received by the subscription service and then sent to the programmer.

In the above example, authentication provides a subscriber's identity by indicating who the subscriber is. Authorization entails performing an entitlement check. The entitlement confirms whether the user is authorized to watch content. A subscriber is entitled, or authorized, to access or watch content only after they pay for a subscription. It is possible that a subscriber authenticates with the identity service provider, but does not pay for a subscription. In this example, the subscription service will be able to tell who the subscriber is by transmitting a request to an identity service provider, but the subscription service will not authorize the subscriber to access or watch any content, as they have no entitlements.

The following examples are provided to introduce certain embodiments of the present disclosure. In one embodiment, a subscription service verifies a subscriber's entitlements to watch video programs through a standard set of APIs that retrieve active subscriptions from a distributed cache, which is configured to sustain high traffic volumes. For example, the distributed cache can be a data store or data base that stores entitlement information and authentication states for active subscribers, and the subscription service queries the cache as-needed to quickly retrieve a given subscriber's authentication state, entitlements, and currently-active subscriptions. According to certain embodiments, the subscription service is a cloud-based service and provides the following functions. The subscription service integrates with an identity service provider using a standard set of APIs exposed to a content provider's site or app for creating and querying a subscriber's identity and authentication state with the identity service provider. The subscriber's identity and authentication state is verified irrespective of the particular identity service provider the content provider has selected to use. For instance, the identity service provider can be a third-party identity service provider the content provider has selected. According to this embodiment, the subscription service stores configuration details of the identity service provider and stores a state of the subscriber's authentication session with the identity service provider.

In an embodiment, the subscription service allows users to create subscriptions to watch video content offered by a content provider. This is accomplished using a standard set of APIs exposed to the content provider's site or app. The APIs are used to invoke functions for creating, editing, and querying subscriptions of the user. The subscription service communicates with a payment service provider to store configuration details supplied by the payment service provider. The subscription service calls APIs of the payment service provider to process subscription payments.

In one example, the subscription service checks subscriber's entitlements before allowing them to watch video content. This is accomplished using a standard set of APIs exposed to the content provider's site or app. The APIs are used for checking to see if the subscriber has an active subscription, and to query for associated entitlements that the subscriber has. According to this example, the subscription service retrieves an active subscription and associated entitlement(s) from a distributed cache for high performance and high availability.

As used herein, the terms "programmer," "content programmer," and "content provider" refer to a person, business entity, or electronic devices operated by the person or business entity, that provide video content or other media content. The content may be made available on one or more channels provided by one or more multi-channel media distributors. In one example, a programmer is an entity that creates content, organizes content, or otherwise makes content available for multiple media channels (e.g., television channels). Programmers also make their media content available to users via networks other than the dedicated networks of the multi-channel media distributors. In one example, a programmer publishes a mobile device application for installation on client devices that accesses video content from the programmer directly for display on the mobile devices. In another example, a programmer publishes a website that includes a plugin or other component that accesses video content from the programmer directly for display on client devices.

As used herein, the term "media content" refers to video content, audio content, or some combination thereof that is playable on electronic devices such as tablet devices, laptop computers, game consoles, mobile phones, and televisions with set-top boxes. In one example, media content is provided over a network as a file that is saved locally on a client device (see, e.g., network 128 and devices 124*a-c* in FIG. 1) for subsequent access. In another example, media content is provided as streaming content over a network for playback on the client device. A variety of types of electronic devices can be used to access or playback the media content. As examples, any of a television, a desktop computer, a laptop computer, a mobile phone, a gaming console, a portable gaming device, a tablet device, an Internet-of-things (IoT) device, an automobile electronic system, a satellite radio receiver, or any other electronic device having display or audio capabilities to display graphics or play sound can be used to play streamed or downloaded media content.

As used herein, the terms "video" and "video content" refer to time-based media content playable on a television, tablet, mobile phone, or other electronic device. Video includes visual and audio content. In one example, video is provided over a network as a file that is saved locally on a client device for subsequent playback. In another example, video is streamed over a network for playback on the client device. A variety of types of electronic devices can be used by a user or subscriber to playback the video. As examples, any of a television, desktop computer, laptop, mobile phone, mobile computing device, tablet, IoT device, gaming console, automobile electronic system, or any other electronic device having display and audio capabilities to display graphics or play sound can be used to play a streamed or downloaded video.

As used herein, the term "user" refers to a person, or a device operated by the person, that requests or receives downloaded or streamed videos from a programmer. A user can also be an entity such as organization or enterprise. For example, a user can be a university, a hotel, a restaurant, or a business that requests or receives downloaded or streamed videos from a programmer. A user has a subscription with a programmer or content provider instead of a multi-channel media distributor in some embodiments. In some embodiments, a user uses a mobile device with multiple apps that access programmers or content providers to receive and view videos based on subscription credentials for a programmer that separately provides videos to the user through a separate dedicated network.

As used herein, the term "subscriber" refers to a user having an account to receive media content such as video content from a programmer or content provider. In some embodiments, a subscriber has a subscription that is time-based. For example, a subscriber can be a user who pays a monthly fee to receive television content from a programmer at the user's residence. In another embodiment, the subscriber pays a monthly fee to access videos or audio items (e.g., albums, songs, audio books, satellite radio programs, podcasts) from multiple sources through the Internet and also uses the Internet to access additional videos directly from programmers through the Internet.

As used herein, the term "multi-channel media distributor" refers to a service that distributes videos or other media content for multiple channels from one or more programmers to multiple users. A multi-channel media distributor typically provides media content based on user subscriptions and to users via a dedicated network. For example, a cable television provider provides multi-channel television videos over a cable network. Also, for example, a satellite radio provider provides multi-channel audio content over a satellite network.

As used herein, the term "multi-channel video program distributor" (MVPD) refers to a multi-channel media distributor that distributes video programs such as television programs, sporting events, and movies. Examples of MVPDs include cable television companies and satellite television providers.

As used herein, the term "authenticate" refers to determining that a subscriber or user is associated with a particular identity, account, or subscription maintained by a content provider or programmer. Authenticating a user involves determining who the user is based on a user name and password provided by the user in some embodiments.

As used herein, the term "authorized" refers to a subscriber or user having permission, based on the user's identity, account, or subscription with a content provider or programmer, to access a particular video. In one example, an authorized user will be an authenticated subscriber who has an entitlement or authorization to access some videos, but not other videos. Authorizing a user involves checking the entitlements of the user to determine what content the user is entitled to access in some embodiments.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Example System

Referring now to the drawings, FIG. 1 is a block diagram depicting an example of a system in which a subscriber 112 attempts to receive video or other media content from one or more programmers 108 over one or more data networks 128. In this example, the subscriber 112 accesses the data network 128 with subscriber devices 124a-c. It is possible for subscribers to use any number of devices and for each device to be shared by any number of subscribers and other users.

As shown in FIG. 1, programmers 108 are content providers and the subscriber 112 can use one or more of devices 124a-c to navigate to websites or apps of programmers 108. For example, if device 124a is a mobile device, subscriber 112 accesses media content by launching a mobile app of a programmer 108. Computing devices associated with the programmers 108 provide the requested media content if the users are authenticated and the users' authorization to access the particular media content is confirmed by using a subscription service 102. The subscription service 102 communicates via network 128 with identity service provider 106 and payment service provider 110 to confirm that subscriber 112 is authorized to receive requested video content from programmers 108.

In addition to accessing content directly from programmers 108, the subscriber 112 can have one or more subscriptions to receive television or other video content from an MVPD 126 through a dedicated network (not shown). In another example, the subscriber 112 receives media content from a multi-channel media distributor that distributes other media content, such as a distributor of channels of audio content (e.g., a satellite radio provider or a streaming audio service). The subscriber 112 accesses media content (e.g., videos or audio items) on one or more of devices 124a-c by contacting one or more programmers 108.

In the example of FIG. 1, a subscription service 102 is used to authenticate subscribers and to check the subscribers' entitlements to confirm that the subscribers are authorized to access certain media content. The subscription service 102, which includes suitable program code executed by one or more computing devices, communicates with programmers 108, identity service provider 106, and payment service provider 110 via one or more data networks 128. In some embodiments, programmers 108 receive requests for media content (e.g., video programs) from one or more of the subscriber devices 124a-c via the data network 128. In response to the requests for media content, the programmers 108 transmit subscriber queries to subscription service 102.

One example of a subscriber query is a query for profile information about a subscriber 112. The profile information can include, for example, the subscriber's first and last name, phone number, address, and authentication status. Another example of a subscriber query is a check entitlement query to determine if the subscriber 112 is entitled to access to privileged content offered by a programmer 108. In one example, a response to a check entitlement query submitted via an API can be an HTTP status of 200 if the subscriber entitlement is available, or an HTTP status of 403 if no entitlement is available for the subscriber.

The subscription service 102 transmits the subscriber queries (or data derived from the queries) to one or more of the identity service provider 106 and the payment service provider 110. Instead of relying on MVPD 126 to perform authentication or authorization operations for subscriber 112 on behalf of the programmers 108, embodiments use the subscription service 102 to communicate with identity service provider 106 and payment service provider 110 in order to determine that the subscriber 112 is authorized to access content from the programmers 108 at one or more of the subscriber devices 124a-c.

As shown in the example of FIG. 1, programmers 108 are content providers who make their content available via web sites or applications. For example, a programmer 108 can provide a mobile app or web site usable by subscriber 112 at subscriber devices 124a-c to access authenticated streaming video content or authenticated video on-demand content (e.g., movies and television programs). Programmers 108 use the subscription service 102 to authenticate the subscriber 112 in order to allow the subscriber 112 to access to streaming video content provided via an app or website at subscriber devices 124a-c without having to rely on MVPD 126 to verify that the subscriber 112 is a current subscriber to a television channel offered by MVPD 126.

In accordance with embodiments, the subscription service 102 enables paid subscriptions for watching video programs offered by programmers 108 by integrating third-party identity service provider 106 and third party payment service provider 110. By using the system shown in FIG. 1, instead of relying on MVPD 126 to provide video programs to subscriber 112, programmers 108 can reach subscriber 112 directly. This direct provision of video programs to subscriber 112 can be accomplished without requiring programmers 108 to perform identity management, entitlement management, or subscription payment processing services. Instead, programmers 108 can delegate these tasks to subscription service 102, which in turn requests responses from third-party identity service provider 106 to authenticate subscriber 112 and third party payment service provider 110 in order to verify that subscriber 112 is allowed to access a video program. For example, subscription service 102 can use API calls to exchange data with a programmer 108 and identity service provider 106 to create a subscriber identity for subscriber 112.

Also, for example, subscription service 102 can use API calls to exchange data with a programmer 108 and payment service provider 110 to create a subscription package, which allows the programmer 108 (e.g., a content provider) to create tiers of packages. In certain embodiments, the tiers of packages include a basic tier for just the current seasons of television shows and some movies (e.g., older releases) and a higher level tier for more seasons of television shows (e.g., past seasons) and more movies. For instance, subscriber 112 can select a subscription package with a platinum tier to access all episodes of television shows and newer movie releases offered by a programmer 108. The selection of the tier of the subscription can be communicated between programmer 108 and payment service provider 110 by the subscription service 102.

Additionally, for example, subscription service 102 can use API calls to exchange data with a programmer 108 and a distributed cache (see, e.g., cache 204 in FIGS. 2-4) to check an entitlement of a subscriber. For example, an API call can be used to submit an entitlement query to determine if the subscriber 112 is still entitled to stream, download, or otherwise access requested content. In this example, the subscription service 102 determines, based on retrieving an authentication state, active subscription information, and entitlements from a cache, whether to continue allowing the programmer 108 to provide media content to subscriber 112 or to cause the programmer 108 to terminate the provision of the media content. For example, if a query response from the cache indicates that the subscriber 112 is no longer authorized to watch a video that is being streamed based on a temporary grant of access, the subscription service 102 will instruct the programmer 108 to cut off the streaming of the video.

Example Data Flows and APIs

Example data flows for the API calls mentioned in the preceding paragraphs are described below with reference to FIGS. 2-4.

Figure 2:
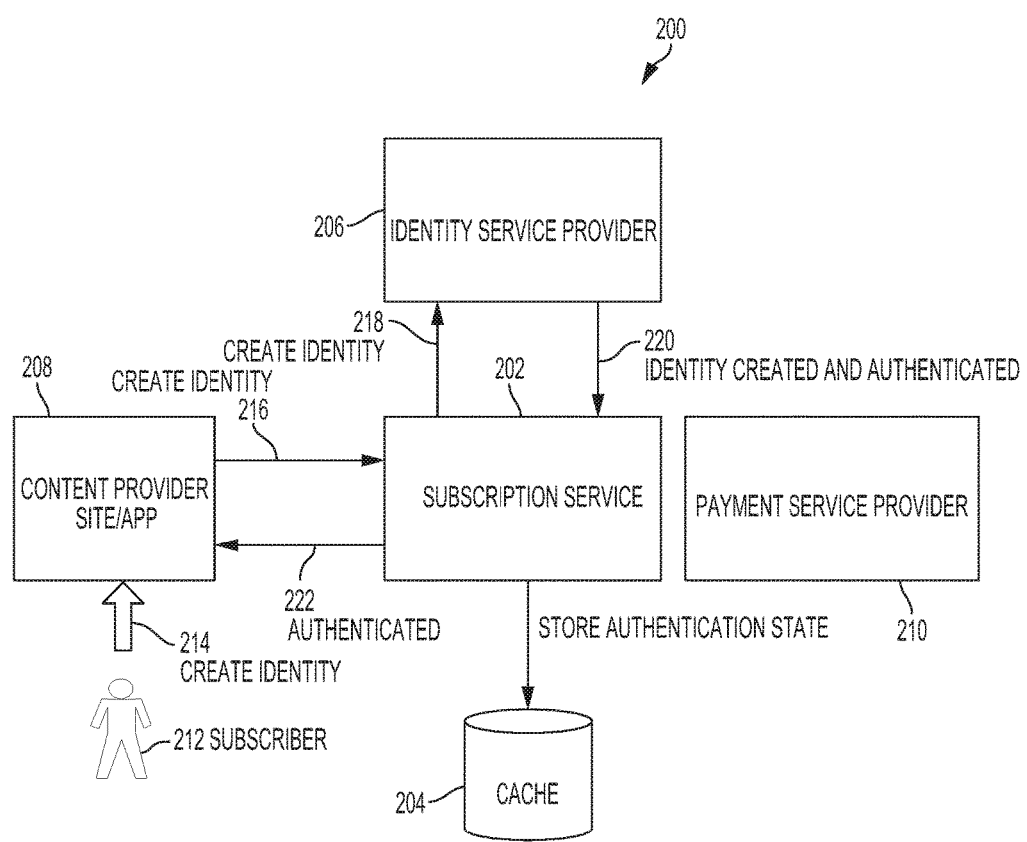
FIG. 2 is a block diagram illustrating communications between a content provider, a subscription service, and an identity service provider for creating and authenticating a subscriber identity according to certain exemplary embodiments.

FIG. 2 is a block diagram illustrating communications between a content provider 208, a subscription service 202, and an identity service provider 206 for creating and authenticating a subscriber identity according to certain embodiments. FIG. 2 illustrates a data flow 200 for the subscription service 202 that executes on a computing device in order to create an identity and authenticate subscriber 212. In particular, data flow 200 is used so that content provider 208 can create an account with the subscription service 202 to integrate the content provider's web applications and mobile applications, which in turn provide subscriber 212 with access to privileged content.

In an embodiment, the subscription service 202 is hosted on a cloud-based platform. For example, the subscription service 202 can be a cloud-based service accessible by the content provider 208. The subscription service 202 is configured to carry out data flow 200 in order to integrate with the identity service provider 206. This integration is accomplished by using a standard set of APIs that are exposed to the content provider's 208 site or app. As discussed below with reference to Table 1, these APIs are used to create an identity for the subscriber 212 and to query the identity service provider 206 to determine that subscriber's identity and authentication state. The subscription service 202 can carry out data flow 200 irrespective of whatever identity service provider 206 (e.g., a third-party identity service provider) the content provider 208 has selected to use. The subscription service 202 stores configuration details of the selected identity service provider 206 for use during subsequent communications. As shown in FIG. 2, the subscription service 202 also stores the state of the subscriber's authentication session with the identity service provider 206 in a cache 204.

Data flow 200 begins when subscriber 212 provides information 214 to content provider 208 for creating an identity. The information can be provided via a user interface of an app or website displayed on any of the subscriber devices 124a-c depicted in FIG. 1. The subscriber 212 interacts with the app or website of content provider 208 to furnish information 214 needed to create an identity. As shown in the example provided in Table 1 below, an identityInterface API can load a user interface that is usable to enter login credentials or information needed to create an identity for the subscriber 212. Examples of such information can include a user name, contact information (e.g., an email address), and a user-selected password. The content provider 208 then interacts with the subscription service 202 via an API to send a create identity request 216.

In an alternative embodiment, the subscriber 212 creates an identity with identity service provider 206. According to this embodiment, the subscriber's device is redirected to a form hosted by identity service provider 206. The form can be, for example, an interactive user interface including a user registration form that the subscriber 212 can use to enter credentials needed to create a new subscriber identity. The redirection to the form can be accomplished by calling another API exposed by the subscription service 202, for example, a redirectToCreateIdentity API. The subscriber 212 can enter credentials directly in the form and the form can then be submitted to the identity service provider 206. As depicted in FIG. 2, once the identity is created, the identity service provider 206 will send a response 220 to subscription service 202. The response 220 can include authentication information indicating one or more levels of access the new subscriber has for media content offered by the content provider 208. For instance, the authentication information in response 220 can indicate one or more subscription packages or tiers of packages offered by the content provider 208 that the newly created subscriber have privileges to access. The privileges can be based on subscriptions that the new subscriber signed up for or requested via the form. The data flow 200 will then continue as shown in FIG. 2 and described below. In this embodiment using a user interface form hosted by the identity service provider 206, there is no need for the content provider 208 to call the identityInterface API and send a create identity request to the subscription service 202. In addition, this embodiment eliminates the need for the subscription service 202 to send the create identity request 218 to the identity service provider 206. That is, when the redirectToCreateIdentity API is called in order to redirect the subscriber's device to a form hosted by identity service provider 206, there is no need for the subscription service 202 to call the createIdentity API listed in Table 1 below.

In one example, the subscription service 202 uses the identity service provider 206 to create an identity of the subscriber 212 and confirm that the subscriber 212 is authenticated. In another example, the subscription service 202 stores an authentication state provided by the identity service provider 206 in a subscriber database or cache 204. In this way, the cache 204 can be subsequently queried by the subscription service 202 to determine whether the subscriber 212 is an authenticated user with a subscription allowing access to content provided by content provider 208.

By completing data flow 200, an identity for the subscriber 212 is created and authenticated. That is, data flow 200 creates an identity for the subscriber 212, and also authenticates and authorizes the subscriber 212 when the subscriber 212 attempts to access media content provided by the content provider 208. In some embodiments, the subscription service 202 uses the APIs listed in Table 1 to facilitate exchanges of identity data (e.g., authentication data, authorization data, etc.) between identity service provider 206 and content provider 208. For example, the createIdentity API call shown in Table 1 below is used to communicate the create identity request 218 to the identity service provider 206, which in turn creates and authenticates the requested identity. The identity service provider 206 then provides information for the created identity and its associated authentication data to the subscription service 202 by sending response 220. The subscription service 202 stores the authentication state in cache 204 for later retrieval, and provides an authentication confirmation 222 to content provider 208 based on authentication data received from the identity service provider 206. Table 1 provides example API names, protocols, and parameters for the communications shown in FIG. 2.

TABLE 1

| Reference Number | API Name | Descr. | Protocol/ Method | Parameter Name | Parameter Value | Return Value |
|---|---|---|---|---|---|---|
| 214 | identity Interface | API to load User Interface for creating identity creation or signing-in the subscriber | HTTP/ GET | apiKey | API Key supplied by the Subscription Service | HTML Markup that is loaded in the User Agent (browser) that allows subscriber to login or create new identity profile |
| 216 | createIdentity | API to create identity | HTTP/ POST | apiKey | API Key specific to the content provider, supplied by the Subscription Service | HTTP status code 200 for success (Response 222 in FIG. 2) |
|  |  |  |  | username | Unique user name selected by the subscriber |  |
|  |  |  |  | password | Password selected by the subscriber |  |
|  |  |  |  | emailId | Email address of the subscriber |  |
|  |  |  |  | profile | A JSON structure representing additional details about the user such as first and last name, phone, address and so on. |  |
| 218 | createIdentity | API exposed by the third-party identity service provider 206. Details of the API depend on the third-party provider. This API is not exposed by subscription service 202. | HTTP/ POST | Almost all parameters received in 216, except the apiKey, which will be irrelevant to the third-party provider |  | HTTP Status Code 200 for success (or whatever the third-party identity provider returns) (Response 220) |

The subscription service 202 can be executed in the background (e.g., in a manner invisible to subscriber 212) to create an identity and confirm authentication of the subscriber 212 for requested videos. For example, the subscriber 212 accesses the website or application of the content provider 208 and requests that an identity be created for accessing a video or other media content. The content provider 208 transmits, based on the identity information 214 provided by subscriber 212 requesting the video or other media content, relevant user data for create identity request 216.

In FIG. 2, the content provider 208 receives a request, for media content from the subscriber 212 via a data network. The subscription service 202 facilitates this communication between a subscriber device 124 used by subscriber 212 and one or more content providers 208. The identity information 214 and the create identity request 216 both include an apiKey. The content provider 208 sends the apiKey as a parameter as part of identity information 214 when making API requests to the subscription service 202. This API key enable the subscription service 202 to identify settings that are specific to the content provider 208 and respond to API requests from the content provider 208 accordingly.

As shown in FIG. 2, one API request that is sent from the content provider 208 to the subscription service 202 is a create identity request 216. The create identity request 216 includes an API key that is specific to the content provider 208. In the embodiment shown in Table 1, the API key is the apiKey parameter and the create identity request 216 also includes a username, password for the subscriber 112 that identify an identity, account, or other subscription information for the subscriber 212. In additional or alternative embodiments, other suitable credentials are used to create an identity for the subscriber 212. The content provider 208 sends the credentials to the subscription service 202 in create identity request 216. The content provider 208 transmits this communication based on, for example, being configured to create, authenticate, and authorize users using the subscription service 202.

The subscription service 202 then sends information that it received in the create identity request 216 in a create identity request 218 that is sent to the identity service provider 206. In some embodiments, create identity request 218 can include credentials for subscriber such as, for example, a name and contact information (e.g., email address, phone number). In the example shown in Table 1, the create identity request 218 includes most of the parameters from the create identity request 216, with the exception of the apiKey. In additional or alternative embodiments, the create identity request 218 can include social media login information that subscriber 212 uses for social media account (e.g., a Facebook, Google+, LinkedIn, or other social media login information). The option as to what type of information is included in create identity request 218 is left up to the content provider 208. Then, identity service provider 206 creates an identity and sends the created identity with response 220 and the identity's authentication information back to the subscription service 202. The authentication information can indicate the level of access the new subscriber has for media content. For example, the authentication information can indicate a subscription package or tier of packages available from the content provider 208 that the newly created subscriber has privileges to access. Data flow 200 allows the subscription service 202 to create an identity for subscriber 212, and authenticate subscriber 212 as subscriber 212 is requesting content from the content provider 208. In some embodiments, data flow 200 involves storing an authentication state in cache 204 so that the subscription service 202 can subsequently authenticate that subscriber 212 has a valid subscription with the content provider 208 or to confirm that subscriber 212 is still authorized to receive the media content from content provider 208. Additionally or alternatively, the subscription service 202 periodically accesses the cache 204 to confirm that previously authenticated subscribers are still authorized to receive media content from content provider 208.

Figure 3:
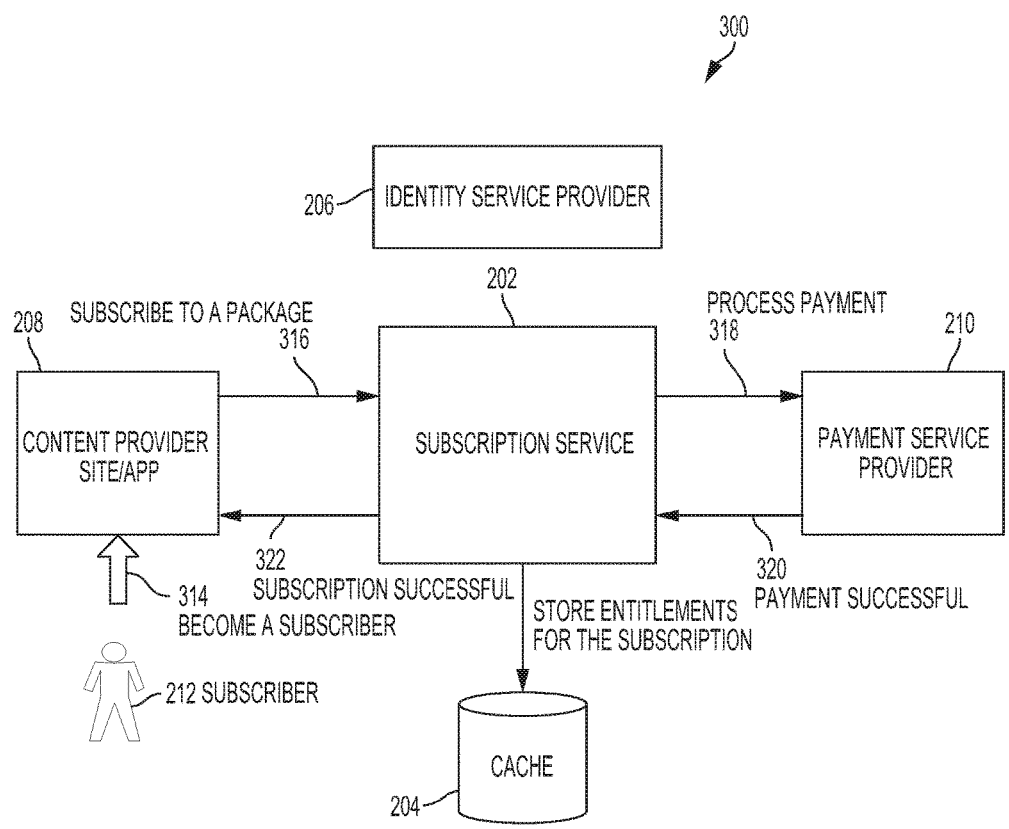
FIG. 3 is a block diagram illustrating communications between a content provider, a subscription service, and a payment service provider for creating subscriptions and processing subscription payments according to certain exemplary embodiments.

FIG. 3 is a block diagram illustrating communications between content provider 208, subscription service 202, and a payment service provider 210 for creating subscriptions and processing subscription payments according to certain embodiments.

In particular, FIG. 3 illustrates a data flow 300 that allows the subscriber 212 to create subscriptions to watch video content offered by the content provider 208. In an embodiment, this is accomplished by using a standard set of APIs exposed to the content provider's site or app. The APIs are used to create, edit, and query subscriptions of the subscriber 212. As part of data flow 300, the subscription service 202 stores configuration details of the payment service provider 210. The subscription service 202 calls APIs of the payment service provider 210 in order to process subscription payments.

Data flow 300 begins when subscriber 212 provides subscription information 314 to content provider 208 for becoming a subscriber. The subscription information 314 can be provided via a user interface of an app or website displayed on any of the subscriber devices 124a-c depicted in FIG. 1. The subscriber 212 interacts with the app or website of the content provider 208 to furnish subscription information 314 needed to subscribe to a package offered by the content provider 208.

In response to receiving subscription information 314, the content provider 208 sends a subscription request 316 to the subscription service 202. As shown in the example provided in Table 2 below, an enrollUserToSubscriptionPlan API can be called with parameters for providing information needed to enroll subscriber 212 to a subscription plan. Examples of such information can include a subscriber-selected username, a subscription plan identifier (i.e., an identifier of a subscription plan offered by the content provider 208) and an API key supplied by the subscription service 202. The subscription service 202 then interacts with the payment service provider 210 via an API to process a payment for the subscription. In the example of FIG. 3, the subscription service 202 sends a process payment request 318 to the payment service provider 210 and then receives a response 320 after the payment is successfully processed. As detailed in Table 2 below, a processSubscriptionPlanEnrollmentPayment API exposed by the payment service provider 210 can be called by the subscription service 202 in order to send the process payment request 318.

Table 2 below provides example API names, protocols, and parameters for the communications shown in FIG. 3.

TABLE 2

| Ref. Num. | API Name | Descr. | Protocol/ Method | Parameter Name | Parameter Value | Return Value |
|---|---|---|---|---|---|---|
| 316 | enrollUserTo SubscriptionPlan | API to enroll a user to the subscription plan | HTTP/ POST | apiKey | API Key supplied by the Subscription Service | HTTP Status Code 200 for success |
|  |  |  |  | Subscription PlanId | Identifier of the subscription plan offered by the Content Provider |  |
|  |  |  |  | username | Unique user name selected by the subscriber |  |
| 318 | processSubscription PlanEnrollment Payment | API exposed by the third-party payment provider service to process payment as a result of a user enrolling to a subscription plan. This API is not exposed by Subscription Service 202. |  | Payment Provider ApiKey | API Key supplied by the third-party payment provider service | HTTP Status Code 200 for success (or whatever the third-party identity provider returns) (Response 320 in FIG. 3) |
|  |  |  |  | Subscription PlanId | Identifier of the subscription plan offered by the Content Provider |  |
|  |  |  |  | termPrice | Term price of the subscription plan |  |
|  |  |  |  | currency |  |  |
|  |  |  |  | termType | Plan term (e.g. monthly, quarterly, yearly) |  |
|  |  |  |  | Enrollment Activation Date | Date from which plan enrollment is active |  |
|  |  |  |  | autoRenew | true/false Tells whether the enrollment will be renewed after end of the term |  |

Figure 4:
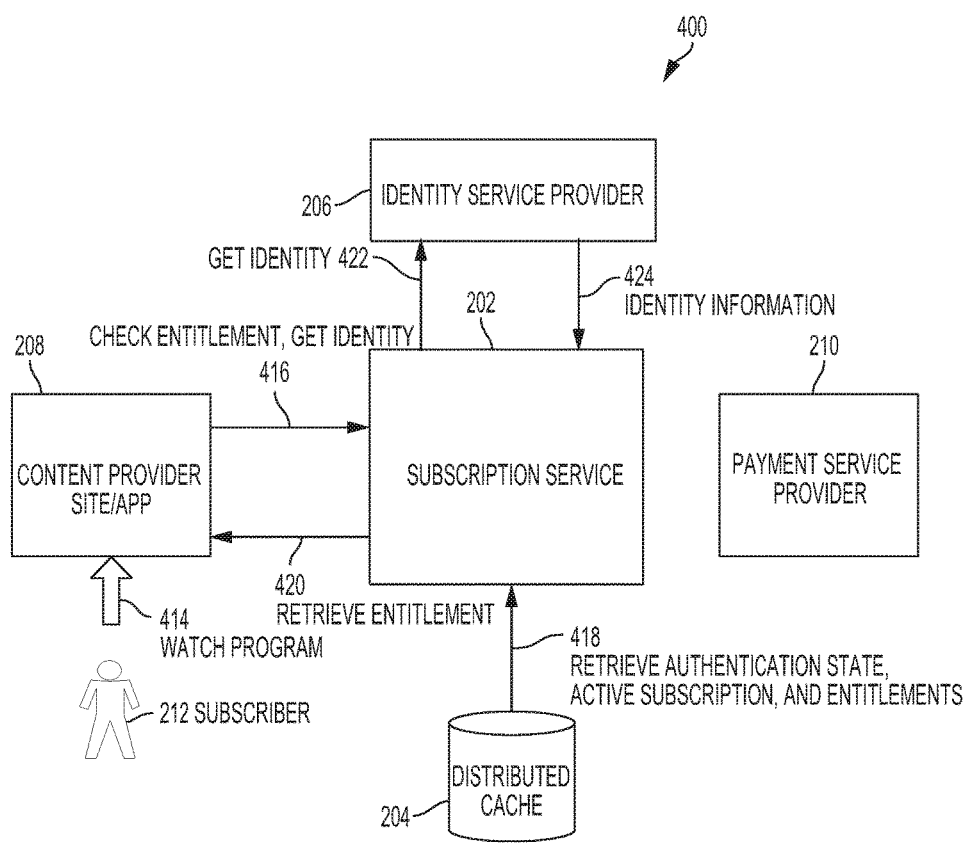
FIG. 4 is a block diagram illustrating communications and data flows between a content provider, a subscription service, and a distributed cache for retrieving a subscriber's authentication state and entitlements according to certain exemplary embodiments.

FIG. 4 is a block diagram illustrating communications and data flows between the content provider 208, the subscription service 202, and a distributed cache 204 for retrieving a subscriber's authentication state and entitlements according to certain embodiments.

In particular, FIG. 4 illustrates a data flow 400 that verifies the subscriber's 212 entitlements before allowing the subscriber 212 to watch video content offered by the content provider 208. In an embodiment, this is accomplished by using a standard set of APIs exposed to the content provider's site or app. The APIs are used to check active subscriptions and associated entitlements that the subscriber 212 may have. As part of data flow 400, the subscription service 202 retrieves an active subscription and associated entitlements from the distributed cache 204. This use of the distributed cache 204, as opposed to relying on a remote MVPD, improves the performance of subscriber authentication and entitlement retrieval. Querying the distributed cache 204 instead of a remote database maintained by an MVPD also ensures high availability of entitlement information.

Data flow 400 begins when subscriber 212 submits a request 414 to content provider 208 to watch a program (e.g., a video). The request 414 can be provided via a user interface of an app or website displayed on any of the subscriber devices 124a-c depicted in FIG. 1. The subscriber 212 interacts with the app or website of the content provider 208 to indicate that the request 414 is for a selected program offered by the content provider 208.

In response to receiving the request 414, the content provider 208 sends a check entitlement message 416 to the subscription service 202. As shown in the example provided in Table 3 below, a checkEntitlement API can be called with parameters that provide information needed to determine what programs the subscriber 212 is entitled to watch. Examples of such information can include a subscriber-selected username and an API key supplied by the subscription service 202. The subscription service 202 then uses an API call to query the distributed cache 204. In the example of FIG. 4, the subscription service 202 sends the query to the distributed cache 204 in order to receive a response 418 with an authentication state, active subscription, and entitlements for the subscriber 212.

As shown in FIG. 4, after the subscription service 202 receives response 418, the retrieved entitlement 420 is then forwarded to the content provider 208 so that the content provider 208 can allow the subscriber 212 to access the requested video program.

Table 3 below describes an example checkEntitlement API and lists its protocol and parameters that are used for the check entitlement message 416 shown in FIG. 4. Table 3 also provides examples of other APIs exposed by the subscription service 202. As detailed in Table 3, these other APIs include APIs for querying for a subscriber's identity (getIdentity), logging in the subscriber 212, logging out the subscriber 212, creating a subscription plan, updating a subscription plan, deleting a subscription plan, and showing the subscriber 212 which subscription plans are available from the content provider 208.

TABLE 3

| Ref. Num. | API Name | Descr. | Protocol/ Method | Parameter Name | Parameter Value | Return Value |
|---|---|---|---|---|---|---|
| 416 | check Entitlement | API to query if the subscriber has access to privileged content | HTTP/ GET | apiKey | API Key supplied by the Subscription Service | HTTP Status 200 if entitlement is available. HTTP Status 403 if no entitlement is available. |
| | | | | username | Unique user name selected by the subscriber | |
| | getIdentity | With this API, the Content Provider can query information of a subscriber | HTTP/ GET | apiKey | API Key supplied by the Subscription Service | Profile information about the user such as First and Last name, phone, address etc. |
| | | | | username | Unique user name selected by the subscriber | |
| | login | With this API the content provider can have a subscriber authenticated with the identity service provider | HTTP/ POST | apiKey | API Key supplied by the Subscription Service | Session Identifier upon successful authenticati on with Identity Provider |
| | | | | username | Unique user name selected by the subscriber | |
| | | | | password | Password selected by the subscriber | |
| | logout | This API terminates user's authentication session on the Identity Service Provider | HTTP/ DELETE | apiKey | API Key supplied by the Subscription Service | HTTP Status Code 204 |

TABLE 3-continued

| Ref. Num. | API Name | Descr. | Protocol/ Method | Parameter Name | Parameter Value | Return Value |
|---|---|---|---|---|---|---|
| | | | | username | Unique user name selected by the subscriber | |
| | | | | sessionId | Session identifier obtained during authentication | |
| | create Subscription Plan | API to create subscription plan that the Content Provider offers to the subscriber | HTTP/ POST | apiKey | API Key supplied by the Subscription Service | Subscription Plan Identifier (alphanumeric string) |
| | | | | planName | Name of the subscription plan name | |
| | | | | termPrice | Price for the subscription term | |
| | | | | currency | Currency type (e.g. USD, EUR etc.) | |
| | | | | termType | Type of subscription term (monthly, quarterly, yearly etc.) | |
| | | | | listOfAssets | A JSON structure containing list of assets that the subscriber can access as part of the subscription plan | |
| | | | | activation Date | Date on which this subscription plan will be available to the subscribers to subscribe | |
| | | | | endDate (optional) | Date on which this subscription plan will be discontinued. If no end date is provided, then the plan will be available for an indefinite amount of time | |
| | update Subscription Plan | API to make changes to an existing subscription plan | HTTP/ PUT | apiKey | API Key supplied by the Subscription Service | |
| | | | | subscription PlanId planName termPrice currency termType listOfAssets activation Date endDate | Subscription Plan Identifier | |
| | delete Subscription Plan | API to delete an existing subscription plan | | apiKey | API Key supplied by Subscription Service | |
| | | | | subscription PlanId | Subscription Plan Identifier | |

TABLE 3-continued

| Ref. Num. | API Name | Descr. | Protocol/ Method | Parameter Name | Parameter Value | Return Value |
|---|---|---|---|---|---|---|
| | getSubscription Plan | This API will be used by the Content Provider's Web Application and Mobile Application to show the subscriber available subscription plans to choose from at the time of subscribing | HTTP/ GET | apiKey | API Key supplied by Subscription Service | List of all subscription plans with details in a JSON format |
| | | | | subscription PlanId | Subscription Plan Identifier. This is an optional parameter. If skipped, the API will return all subscription plans available at the content programmer. | |

In some embodiments, data flow 400 retrieves entitlement 420 based on the subscription service 202 receiving a check entitlement message 416 that includes a request to authenticate the subscriber 212. For example, the check entitlement message 416 is used to request, instruct, or otherwise cause the subscription service 202 to determine whether the user name and password match those of an authorized subscriber identity, account, or subscription stored in distributed cache 204 by the subscription service 202 or an accessible third party. For example, transmitting the check entitlement message 416 can involve subscriber 212 submitting a request 414 to watch content (e.g., a television program or movie) and providing a user name and password (or other suitable credentials) to attempt a login required for accessing the content.

In some embodiments, the check entitlement message 416 identifies the video or other media content requested by the subscriber 212, the content provider 208, or both. This identification allows the subscription service 202 to determine whether the subscriber 212 is authorized to access the particular video or to access videos from the particular content provider 208. For example, if a subscription for the subscriber 212 does not include a premium movie channel, the data flow 400 will not authorize the user to have access to movies provided by the premium movie channel content provider 208.

In some embodiments, the data flow 400 also executes business logic that includes business rules for making authentication and authorization determinations. In one example, the business rules identify which videos are available for different subscription classes, pay-per-view requirements for particular videos, and other business rules useful in controlling user authorization.

In some embodiments, computing devices associated with the content provider 208 are used to create and maintain the higher-level web pages or native applications that implement a user software interface for viewing media content. Appropriate functionality is incorporated into these web pages or native applications to implement the authentication and authorization using the subscription service 202. Examples of entitlement flows that are easily implemented using the APIs shown in Tables 1-3 include, but are not limited to, creating the subscriber's identity, checking or obtaining subscriber authentication against a particular identity service provider 206, checking or obtaining user authorization for a particular video, and processing subscription payments using payment service provider 210.

Example Methods

Figure 5:
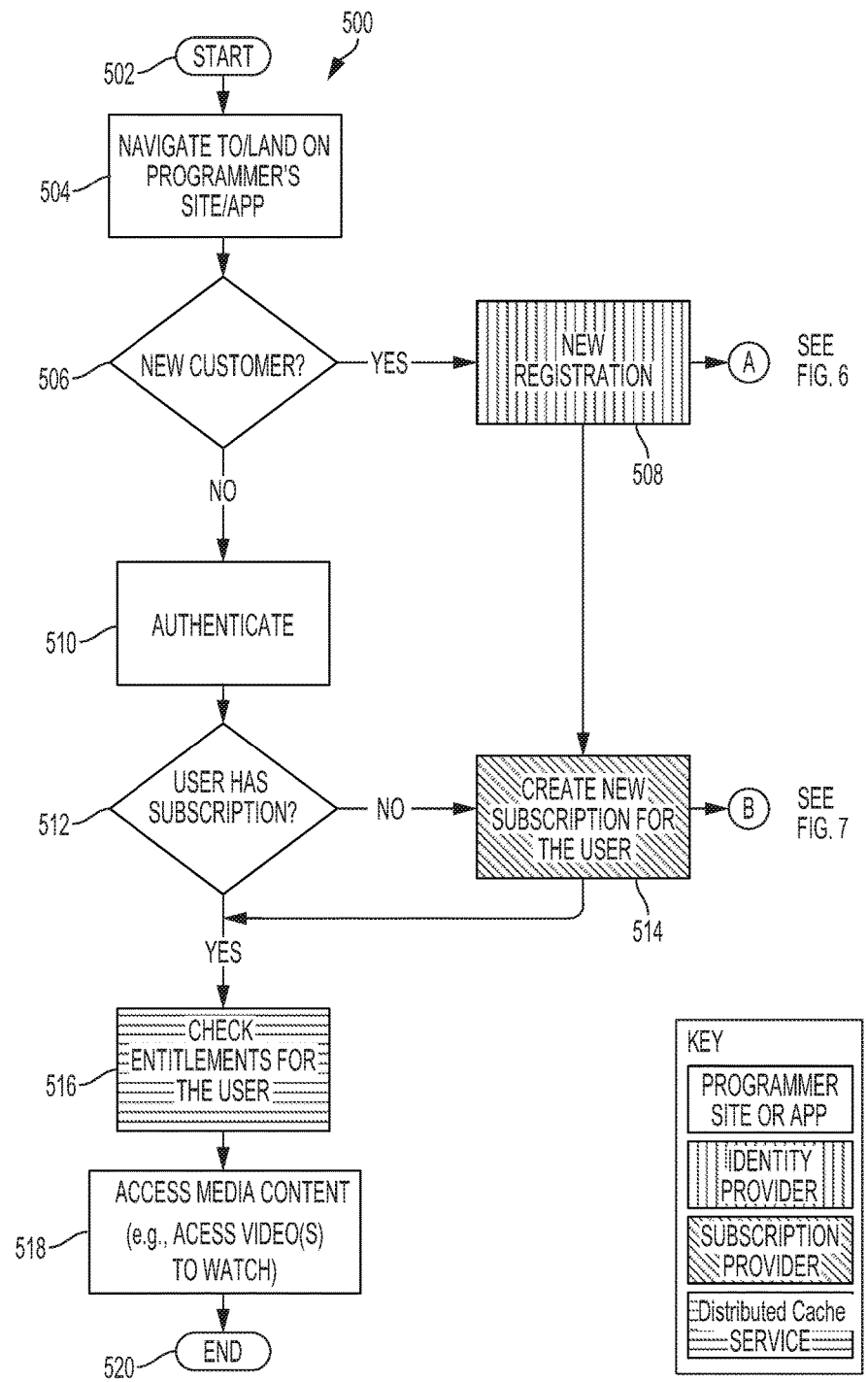
FIGS. 5-7 are flow charts depicting an example of a process for automatically authenticating and authorizing a subscriber seeking to access media content, according to certain exemplary embodiments.
Figure 6:
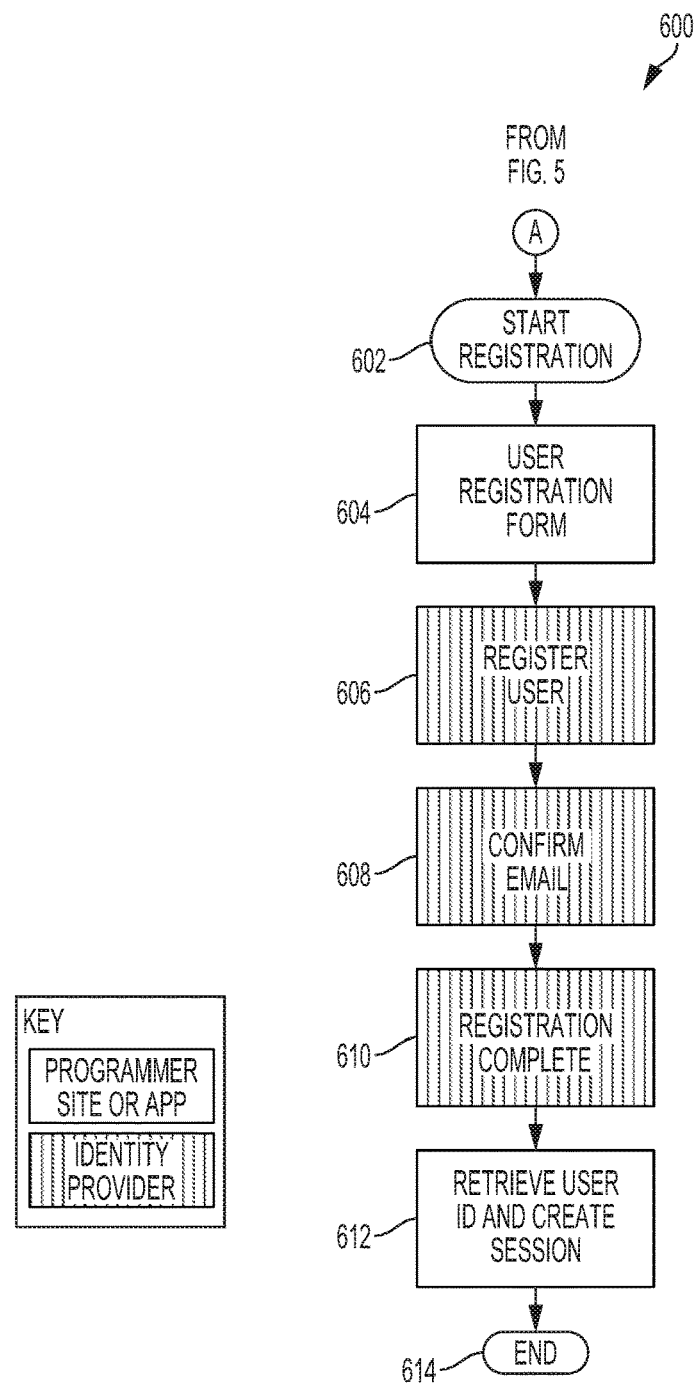
Figure 7:
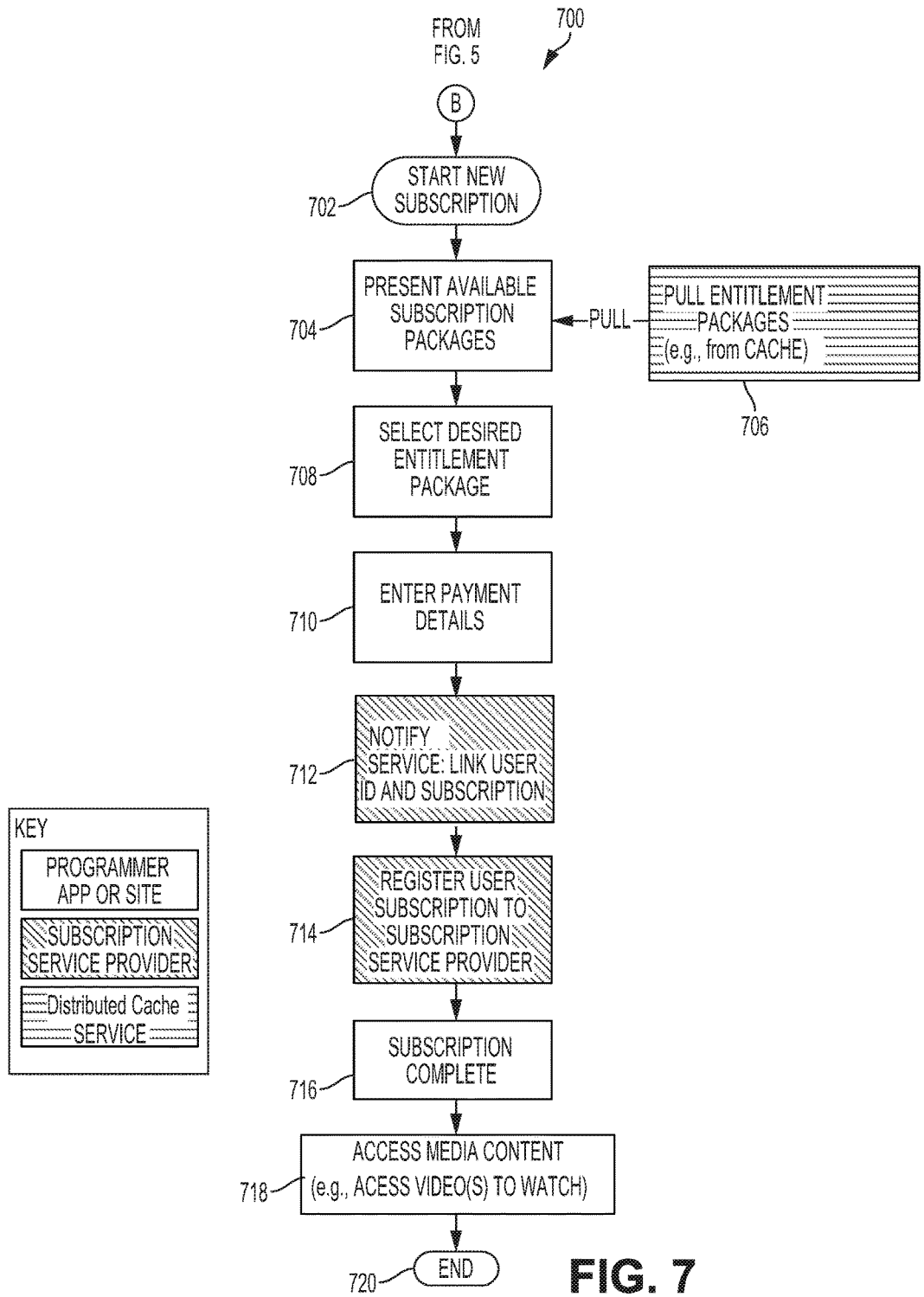

FIGS. 5-7 are flow charts depicting example processes 500, 600, and 700 for automatically authenticating and authorizing a subscriber seeking to access media content, according to certain exemplary embodiments.

Figure 8:
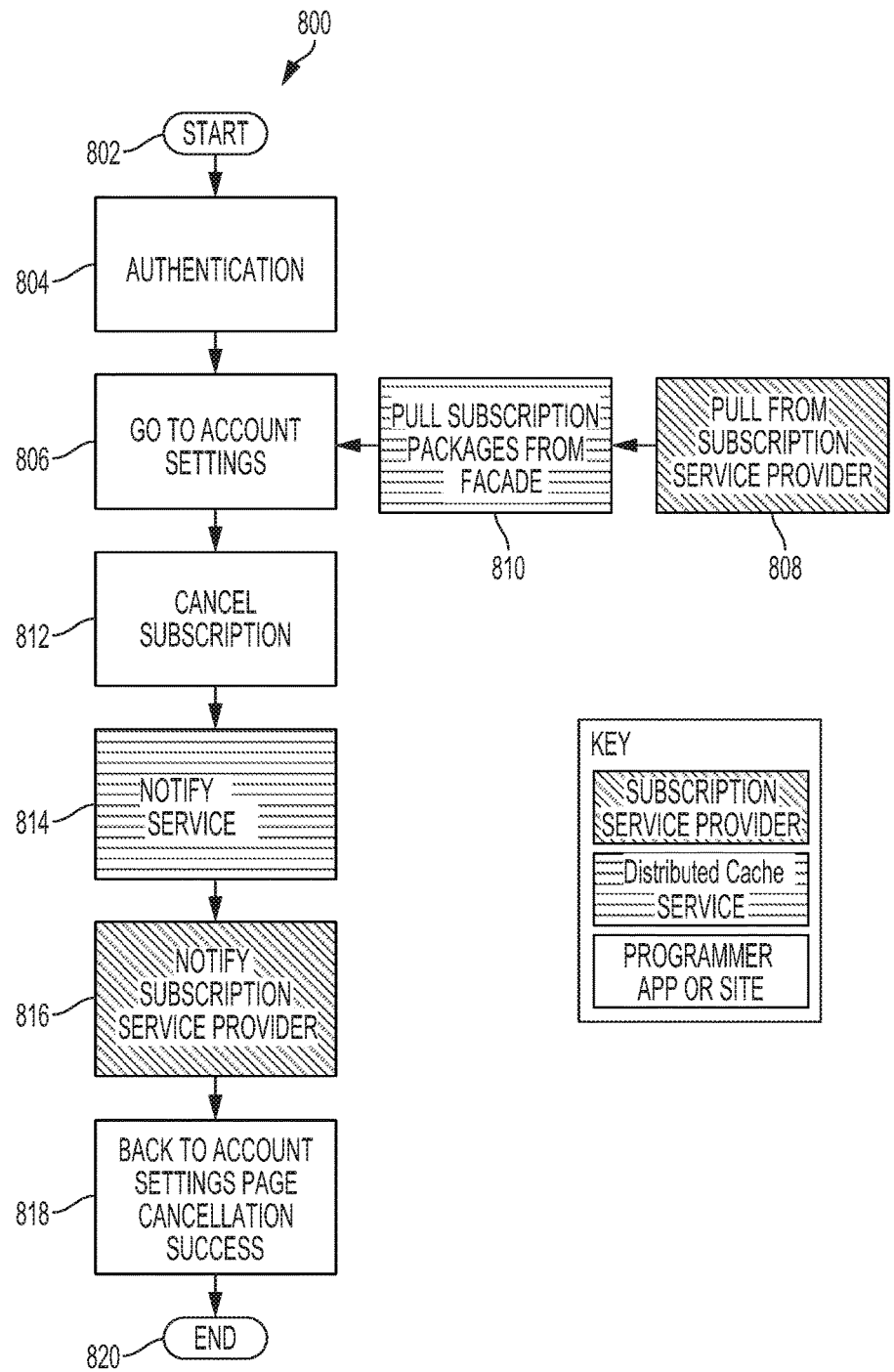
FIG. 8 is a flow chart depicting an example of a process for modifying a subscription according to certain exemplary embodiments.

FIG. 8 is a flow chart depicting an example of a process 800 for modifying a subscription according to certain exemplary embodiments. In some embodiments, one or more computing devices or processing devices implement operations depicted in FIGS. 5-8 by executing suitable program code (e.g., the subscription service 202). For illustrative purposes, the processes shown in FIGS. 5-8 are described with reference to the examples depicted in FIGS. 1-4. Other implementations, however, are possible. As shown in FIGS. 5-8, different blocks of processes 500, 600, 700, and 800 can be performed by different components, modules, or services.

With reference to FIG. 5, a process 500 for authenticating a subscriber and providing content to the subscriber begins at block 502. Process 500 can be performed by at least one computing or processing device executing the subscription service 202 to communicate with multiple computing devices associated with content providers 208, identity service providers 206, and payment service providers 210.

Next, at block 504, process 500 involves receiving a request for a programmer to provide media content to a subscriber. In example embodiment shown in FIG. 5, the request can be received at block 504 when a subscriber 212 navigates to or lands on a programmer's web site or app. The request received at block 504 can be a live request received from subscriber devices 124a-c associated with the subscriber 212. The programmer can be a content provider 208.

Next, at decision block 506, a determination is made as to whether the subscriber 212 is a new customer or not. In block 506, the subscription service 202 communicates via, for example, one or more suitable data networks 128 with identity service provider 206 to determine if the subscriber 212 is new. If it is determined that the subscriber 212 is a new customer, control is passed to block 508 where a new registration is performed.

At block 508, process 500 involves registering a new subscriber. In the example of FIG. 5, at least one processing device executes an identity provider in order to perform block 508. An example of how the subscription service 202 is used to create an identity for a new subscriber is described above with respect to FIG. 2. In the example depicted above with respect to FIG. 2, at block 508, subscription service 202 sends a create identity request 218 to the identity service provider 206. The create identity request 218 can include user credentials (e.g., user name and password) provided to the subscription service 202 by content provider 208. As part of block 508, the subscription service 202 transmits the create identity request 218 to identity service provider 206 via one or more suitable data networks 128, and control is passed to block 514. Additional steps for carrying out block 508 are shown in FIG. 6, which is described below.

Otherwise, if it is determined at decision block 506 that the subscriber 212 is an existing customer, control is passed to block 510, where the subscriber 212 is authenticated. An example of how the subscription service 202 authenticates the subscriber 212 is described above with respect to FIG. 2.

After the subscriber 212 is authenticated, control is passed to decision block 512 where a determination is made as to whether the subscriber 212 has an existing subscription or not. In an embodiment, the subscription service 202 performs block 512 by querying cache 204 to determine if the subscriber 212 already has a subscription. In embodiments involving live requests, which are transmitted by the content providers 208 based on communications with subscriber devices 124a-c, the subscription service 202 determines whether a subscriber is a new customer (i.e., a new subscriber) and whether the subscriber already has a subscription. For example, the subscription service 202 stores records of authentication states in a non-transitory computer-readable medium using distributed cache 204, a database, or other suitable data structure. The records can include time stamps for the content requests and indications of an authentication state, active subscription, and entitlements for authenticated users attempting to access content. Examples of these indications include a "success" flag, a "failure" flag, a "time-out" flag, or any other data describing the result of authentication or authorization requests.

If it is determined that the subscriber 212 has a subscription, control is passed to block 516, where the subscriber's 212 entitlements are checked. Otherwise, control is passed to block 514, where a new subscription is created for the subscriber 212. An example of how the subscription service 202 creates a new subscription for the subscriber 212 is described above with respect to FIG. 3. Additional details for the subscription creation process are depicted in FIG. 7, which is described below.

Once the user has a subscription (either an existing subscription identified at block 512 or a new subscription created at block 514), entitlements are checked at block 516. At block 516, the subscriber's entitlements are determined by retrieving the subscriber's active subscription and its corresponding entitlements (i.e., what content the subscription entitles the subscriber to access or watch). An example of how the subscription service 202 checks and retrieves the subscriber's 212 entitlements is described above with respect to FIG. 4.

After the subscriber's 212 entitlements are checked, control is passed to block 518 where the subscriber is granted access to media content in accordance with the entitlements. In the example of FIG. 5, the subscriber is given access to video content that the subscriber's active subscription entitles the subscriber to watch. As part of process 500, the subscription service 202 can receive, in one or more time periods, multiple requests from multiple subscribers to access content from multiple content providers 208. An example of how these requests are generated and transmitted to the subscription service 202 is described above with respect to FIG. 4.

After granting access to the media content, control is passed to block 520 where process 500 ends.

As shown in FIG. 5, different blocks of process 500 can be performed by different components, modules, or services. For example, blocks 502, 504, 506, 510, 512, 518, and 520 can be performed by the content provider 208 (e.g., a programmer's site or app). Also, for example, block 508 can be performed by the identity service provider 206, block 514 can be performed by the subscription service 202, and block 516 can be performed using the distributed cache 204.

With reference to FIG. 6, a process 600 for registering a new subscriber begins at block 602. Process 600 can be performed by at least one processing device executing the subscription service 202 to communicate with one or more computing devices associated with content providers 208, identity service providers 206, and payment service providers 210.

Next, at block 604, a user registration form is displayed to the subscriber. The form is used by the subscriber 212 to enter information required to create an identity. The form can be displayed in a user interface of an app or website displayed on any of the subscriber devices 124a-c depicted in FIG. 1. The subscriber 212 interacts with the form to furnish information needed to create an identity. As shown in the example provided in Table 1 above, an identityInterface API can load a form that is usable to enter login credentials or information needed to create an identity for the subscriber 212. Examples information enterable via the form can include a user name, contact information (e.g., an email address), and a user-selected password. Also, as described in above, the form can be loaded by redirecting a user interface on the subscriber's device to the identity service provider 206, where the subscriber 212 can furnish information needed to create an identity.

After the subscriber information is entered in the user registration form, control is passed to block 606 where the new subscriber 212 is registered. Block 606 can comprise having the content provider 208 interact with the subscription service 202 via an API to send a create identity request so that the subscriber 212 is registered.

Once the subscriber 212 is registered, control is passed to block 608 where a confirmation email message is sent to the subscriber 212. At this point, control is passed to block 610 where the registration is completed by the identity service provider 206.

After the subscriber 212 is registered, at block 612 the subscriber's user ID can be retrieved and an authentication session is created, at which point control is passed to block 614 where process 600 ends.

With reference to FIG. 7, a process 700 for creating a new subscription begins at block 702. Process 700 can be performed by at least one computing device or processing device executing the subscription service 202 to communicate with one or more computing devices associated with content providers 208, identity service providers 206, and payment service providers 210.

Next, at block 704, a list of the subscription packages available from a selected content provider 208 is presented to the subscriber 212. Block 704 can include showing the subscriber 212 which subscription plans are available from the content provider 208 by pulling or retrieving the content provider's offered entitlement packages from the distributed cache 204 in block 706.

After presenting the available subscription packages, control is passed to block 708 where a selection of a desired entitlement package is received. Then, in block 710, payment details are received from the subscriber 212.

Next, at block 712, the user ID for the subscriber 212 is linked to the selected subscription. In a non-limiting example, block 712 can include using the subscription service 202. In this example, a service can store the linkage information in the distributed cache 204. Control is then passed to block 716 where the subscription creation is completed.

Once the subscription is created, control is passed to block 718 where the subscriber 212 is granted access to media content in accordance with the selected subscription's entitlement package. At this point, control is passed to block 720 where process 700 ends.

With reference to FIG. 8, a process 800 for cancelling a subscription begins at block 802. Process 800 can be performed by at least one computing device or processing device executing the subscription service 202 to communicate with one or more computing devices associated with content providers 208, identity service providers 206, and payment service providers 210.

Next, at block 804, authentication of the subscriber 212 who wishes to cancel a subscription is performed. Block 804 can include authenticating the subscriber 212 based on user credentials received from the subscriber 212.

After the subscriber 212 is authenticated, control is passed to block 806 to go to the subscriber's account settings in order to check the subscriber's entitlements. As shown in FIG. 8, block 806 can include performing block 808 to retrieve subscription information from the subscription service 202 and performing block 810 to pull subscription packages that the subscriber 212 has subscribed to from the distributed cache 204. In the non-limiting embodiment depicted in FIG. 8, block 810 includes pulling the subscription packages from a subscription service façade.

Next, at block 812, a subscription to be cancelled is selected, and control is passed to block 814 where the distributed cache is updated to reflect the cancellation. In the example of FIG. 8, block 814 includes sending a notification of the cancelled subscription to the subscription service façade.

As part of cancelling the subscription, control is then passed to block 816 where the subscription service 202 is notified of the cancelled subscription. At this point, control is passed to block 818 where an account settings page is updated to indicate the successful cancellation of the subscription. Process 800 then ends when control is passed to block 820.

Example Computing Environment

Figure 9:
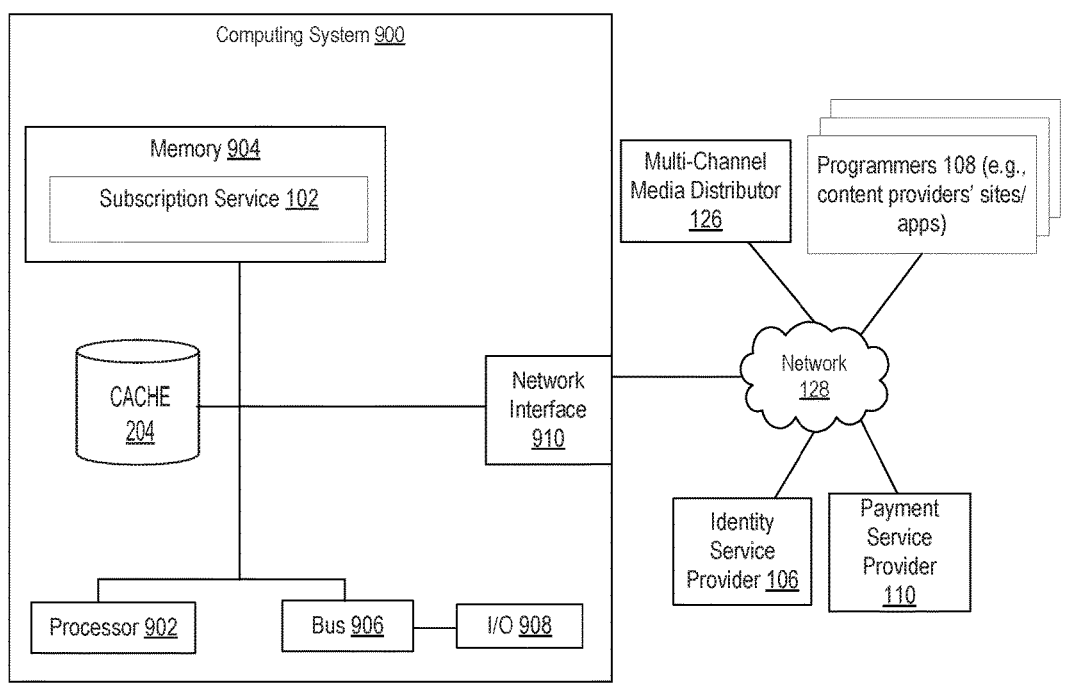
FIG. 9 is a block diagram depicting an example of a computing system used to implement certain embodiments.

Any suitable computing system or group of computing systems can be used for performing the operations described herein. For example, FIG. 9 is a block diagram depicting an example of a computing system 900 that executes the subscription service 102 for authenticating and authorizing a subscriber attempting to access video content.

The depicted example of the computing system 900 includes one or more processors 902 communicatively coupled to one or more memory devices 904. The processor 902 executes computer-executable program code, accesses information stored in the memory device 904, or both. Examples of processor 902 include a microprocessor, an application-specific integrated circuit ("ASIC"), a field-programmable gate array ("FPGA"), or other suitable processing device. The processor 902 can include any number of computing or processing devices, including one.

The memory device 904 includes any suitable non-transitory computer-readable medium for storing the subscription service 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a computing device or processing device can read instructions. The instructions include processor-specific instructions generated by a compiler or an interpreter from code written in any suitable computer-programming language, including, for example, C, C++, C#, Visual Basic, Java, Python, Perl, JavaScript, and ActionScript.

The example computing system 900 also includes a number of external or internal devices such as input or output devices. For example, the computing system 900 is shown with an input/output ("I/O") interface 908 that can receive input from input devices or provide output to output devices. A bus 906 can also be included in the computing system 900. The bus 906 can communicatively couple one or more components of the computing system 900.

The computing system 900 executes program code that configures the processor 902 to perform one or more of the operations described above with respect to FIGS. 1-9. The program code includes, for example, one or more of the subscription service 202, the identity service provider 206, the payment service provider 210, or other suitable applications that perform one or more operations described herein. In some embodiments, the program code is resident in the memory device 904 or any suitable computer-readable medium and is executed by the processor 902 or any other suitable processor. In certain embodiments, the program code described above and data used for determining whether a subscriber 212 is allowed to access content (e.g., credentials, authentication data, etc.) are stored in the memory device 904. In additional or alternative embodiments, one or more of the program code described above and data used for subscriber authentication (e.g., credentials, authentication state, entitlements, etc.) are stored in one or more memory devices accessible via a data network 128, such as a memory device accessible via a cloud service.

The computing system 900 depicted in FIG. 9 also includes at least one network interface 910. The network interface 910 includes any device or group of devices suitable for establishing a wired or wireless data connection to one or more data networks 128. Non-limiting examples of the network interface 910 include an Ethernet network adapter, a modem, and other suitable transceivers. The computing system 900 is able to communicate with one or more online programmers 108, one or more multi-channel media distributors or MVPDs 126, one or more identity service providers 106 and one or more payment service providers 110 using the network interface 910.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system as a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and additions to the present subject matter as would be readily apparent to one of ordinary skill in the art.

What is claimed is:

1. A computer-implemented method for authorizing access to media content independently from multi-channel video program distributors, the method comprising:

receiving, at a subscription service executed by a processing device, a media request for a programmer to provide media content to a subscriber device, the media request comprising subscriber information for a subscriber associated with the subscriber device and an identity request for the subscriber, wherein the subscription service executed by the processing device is remote and separate from a multi-channel video program distributor;

transmitting, from the subscription service, the subscriber information and the identity request to an identity service provider;

receiving, at the subscription service, an authentication status of the subscriber from the identity service provider, the authentication status indicating an identity of the subscriber;

querying, by the subscription service and using the identity of the subscriber, a database comprising subscription information to determine whether the subscriber has a subscription to access the media content;

receiving, by the subscription service, an entitlement check request for the subscriber in response to determining that the subscriber has a subscription to access the media content;

querying, by the subscription service and using the identity of the subscriber, the database to determine whether the subscriber is authorized to access the media content in response to receiving the entitlement check request, the database further comprising entitlement information indicating whether a subscriber is authorized to access a particular media content provided by the programmer;

generating, by the subscription service, an entitlement check response usable for granting the subscriber device access to the media content; and transmitting, by the subscription service and to the programmer, the entitlement check response to grant the subscriber device access to the media content.

2. The method of claim 1, further comprising:

in response to determining, based on the subscriber information, that the subscriber is a new subscriber, transmitting, by the subscription service, the subscriber information to the identity service provider with an identity creation request;

receiving, at the subscription service, an authentication status of the new subscriber from the identity service provider, the authentication status indicating one or more of a subscriber name, an email address, a mailing address, and a phone number for the new subscriber;

transmitting, from the subscription service, to a payment service provider, another entitlement check request for the new subscriber; and receiving, at the subscription service, a response to the entitlement check request from the payment service provider, the response indicating one or more subscription packages or tiers of packages offered by the programmer that the new subscriber has privileges to access.

3. The method of claim 1, further comprising, prior to receiving the media request:

receiving, at the subscription service, from the programmer, a request to create a new identity, the request including credentials corresponding to a new subscriber;

transmitting, from the subscription service, an identity creation request to the identity service provider, the identity creation request including the credentials; and receiving, at the subscription service, from the identity service provider, a response to the identity creation request, the response including authentication information for the new subscriber.

4. The method of claim 1, further comprising, prior to receiving the media request:
receiving, at the subscription service, from the identity service provider, authentication information for a new subscriber, the authentication information being based on credentials entered via a user registration form provided by the identity service provider and accessible from the subscriber device.

5. The method of claim 1, wherein the media request is received via a data network from a computing device associated with the programmer.

6. The method of claim 1, wherein the media request is received from an application associated with the programmer.

7. The method of claim 1, wherein the media request is received from a website associated with the programmer.

8. A system comprising:
a processing device; and
a non-transitory computer-readable medium communicatively coupled to the processing device and storing a subscription service executable by the processing device to perform operations for authorizing access to media content, the operations comprising:
receiving a media request for a programmer to provide media content to a subscriber device, the media request comprising subscriber information for a subscriber associated with the subscriber device and an identity request for the subscriber, wherein the system is remote and separate from a multi-channel video program distributor;
transmitting the subscriber information and the identity request to an identity service provider;
receiving an authentication status of the subscriber from the identity service provider, the authentication status indicating an identity of the sub scriber;
querying, using the identity of the subscriber, a database comprising subscription information to determine whether the subscriber has a subscription to access the media content;
receiving an entitlement check request for the subscriber in response to determining that the subscriber has a subscription to access the media content;
querying, using the identity of the subscriber, the database to determine whether the subscriber is authorized to access the media content in response to receiving the entitlement check request, the database further comprising entitlement information indicating whether a subscriber is authorized to access a particular media content provided by the programmer;
generating an entitlement check response usable for granting the subscriber device access to the media content; and
transmitting, to the programmer, the entitlement check response to grant the subscriber device access to the media content.

9. The system of claim 8, the operations further comprising:
in response to determining, based on the subscriber information, that the subscriber is a new subscriber, transmitting the subscriber information to the identity service provider with an identity creation request;
receiving an authentication status of the new subscriber from the identity service provider, the authentication status indicating one or more of a subscriber name, an email address, a mailing address, and a phone number for the new subscriber;
transmitting to a payment service provider, another entitlement check request for the new subscriber; and
receiving a response to the entitlement check request from the payment service provider, the response indicating one or more subscription packages or tiers of packages offered by the programmer that the new subscriber has privileges to access.

10. The system of claim 8, the operations further comprising, prior to receiving the media request:
receiving from the programmer, a request to create a new identity, the request including credentials corresponding to a new subscriber;
transmitting an identity creation request to the identity service provider, the identity creation request including the credentials; and
receiving from the identity service provider, a response to the identity creation request, the response including authentication information for the new subscriber.

11. The system of claim 8, the operations further comprising, prior to receiving the media request:
receiving from the identity service provider, authentication information for a new subscriber, the authentication information being based on credentials entered via a user registration form provided by the identity service provider and accessible from the subscriber device.

12. The system of claim 8, wherein the media request is received via a data network from a computing device associated with the programmer.

13. The system of claim 8, wherein the media request is received from one of an application or a website associated with the programmer.

14. A non-transitory computer-readable storage medium having executable instructions stored thereon, that, if executed by a processing device, cause the processing device to perform operations for authorizing access to media content, the instructions comprising:
instructions for receiving, at a subscription service executed by the processing device, a media request for a programmer to provide media content to a subscriber device, the media request comprising subscriber information for a subscriber associated with the subscriber device and an identity request for the subscriber, wherein the subscription service executed by the processing device is remote and separate from a multi-channel video program distributor;
instructions for transmitting the subscriber information and the identity request to an identity service provider;
instructions for receiving an authentication status of the subscriber from the identity service provider, the authentication status indicating an identity of the subscriber;
instructions for querying, using the identity of the subscriber, a database comprising subscription information to determine whether the subscriber has a subscription to access the media content;
instructions for receiving an entitlement check request for the subscriber in response to determining that the subscriber has a subscription to access the media content;
instructions for querying, using the identity of the subscriber, the database to determine whether the subscriber is authorized to access the media content in response to receiving the entitlement check request, the database further comprising entitlement information indicating whether a subscriber is authorized to access a particular media content provided by the programmer;

instructions for generating an entitlement check response usable for granting the subscriber device access to the media content; and instructions for transmitting, to the programmer, the entitlement check response to grant the subscriber device access to the media content.

15. The non-transitory computer-readable medium of claim 14, the instructions further comprising:

in response to determining, based on the subscriber information, that the subscriber is a new subscriber, instructions for transmitting, by the subscription service, the subscriber information to the identity service provider with an identity creation request;

instructions for receiving, at the subscription service, an authentication status of the new subscriber from the identity service provider, the authentication status indicating one or more of a subscriber name, an email address, a mailing address, and a phone number for the new sub scriber;

instructions for transmitting from the subscription service, to a payment service provider, another entitlement check request for the new subscriber; and instructions for receiving, at the subscription service, a response to the entitlement check request from the payment service provider, the response indicating one or more subscription packages or tiers of packages offered by the programmer that the new subscriber has privileges to access.

16. The non-transitory computer-readable medium of claim 14, the instructions further comprising:

instructions for receiving, at the subscription service, from the programmer, a request to create a new identity, the request including credentials corresponding to a new subscriber;

instructions for transmitting, from the subscription service, an identity creation request to the identity service provider, the identity creation request including the credentials; and instructions for receiving, at the subscription service, from the identity service provider, a response to the identity creation request, the response including authentication information for the new subscriber.

17. The non-transitory computer-readable medium of claim 14, the instructions further comprising:

instructions for receiving, at the subscription service, from the identity service provider, authentication information for a new subscriber, the authentication information being based on credentials entered via a user registration form provided by the identity service provider and accessible from the subscriber device.

18. The non-transitory computer-readable medium of claim 14, wherein the media request is received via a data network from a computing device associated with the programmer.

19. The non-transitory computer-readable medium of claim 14, wherein the media request is received from an application associated with the programmer.

20. The non-transitory computer-readable medium of claim 14, wherein the media request is received from a website associated with the programmer.

* * * * *